April 14, 1942.    J. BLASS ET AL    2,279,612
CONTROL OF AIRCRAFT
Filed Nov. 26, 1938
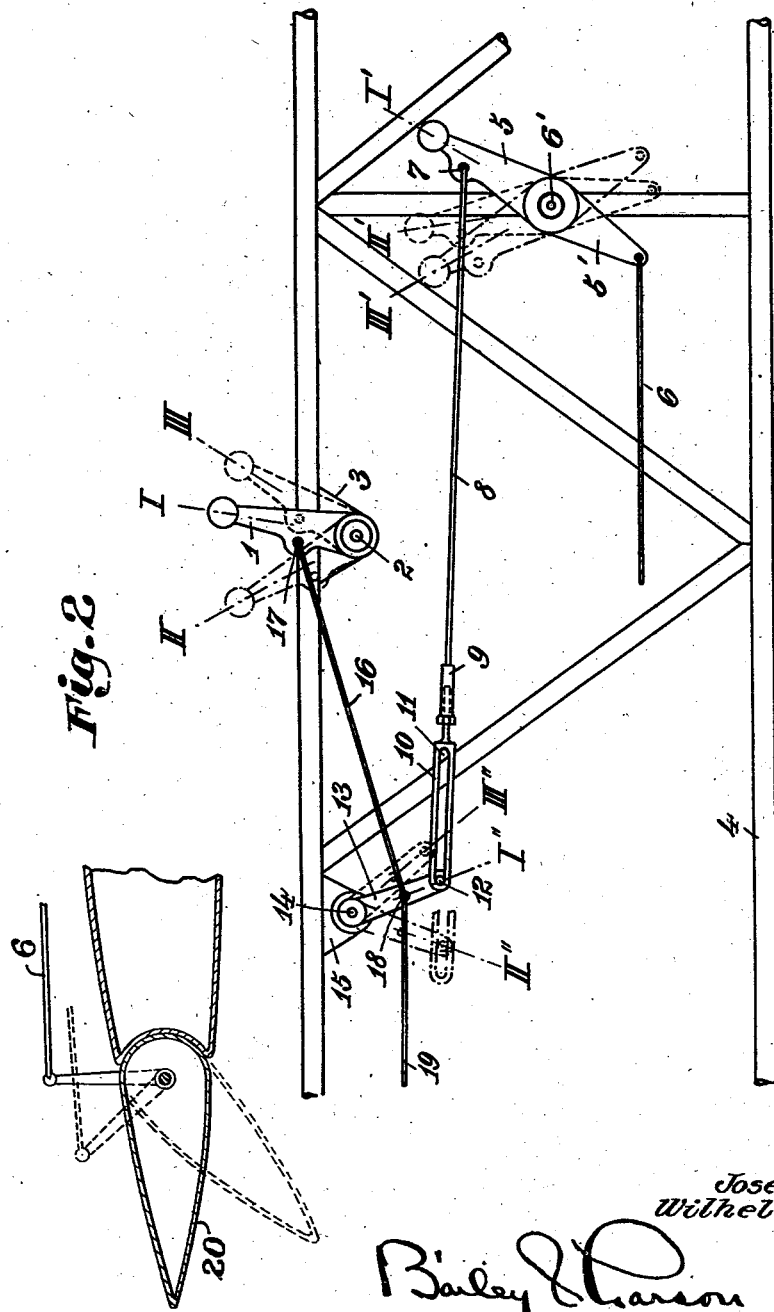
Inventor
Josef Blass,
Wilhelm Langguth,
Attorneys Patented Apr. 14, 1942

2,279,612

UNITED STATES PATENT OFFICE 2,279,612

CONTROL OF AIRCRAFT

Josef Blass and Wilhelm Langguth, Brandenburg, Havel, Germany, assignors to Arado Flugzeugwerke Gesellschaft mit beschrankter Haftung, Brandenburg, Havel, Germany Application November 26, 1938, Serial No. 242,617
In Germany December 7, 1937

7 Claims. (Cl. 244—83)

The invention relates to improvements in the controls of aircraft in which devices are employed as aids in landing in the form of auxiliary control surfaces such as landing flaps, spreading flaps or the like.

When an aircraft so equipped is landing, in general, the engine of the aircraft is throttled back and the auxiliary control surface is fully extended. If now before the aircraft lands on a landing ground, there occurs something unexpected which renders landing impossible or imprudent, the pilot must open up to full throttle in order to avoid mishap.

In such contingencies the maximum climbing ability of the aircraft must often be utilised, and the pilot must at the same time not only set the throttle to full throttle, but also considerably reduce the angle of incidence of the auxiliary surface provided, for example, as a landing flap. This is necessary because, with considerable or with full extension of a landing surface into the air stream, there is produced great increase in drag, and the climbing ability of the aircraft is very much impaired, and, on the other hand, on a strong forward thrust with the landing surface fully extended there may be assumed much earlier dangerous stalling altitudes, as for example a tilting over the wings, than when flying with the landing surface fully retracted or extended only to a small extent.

The invention has for its object to provide a control device which permits of so-called opening-up again solely by actuation of the throttle lever while utilising the maximum climbing ability of the aircraft and without assumption of dangerous altitudes, and which also permits unlimited movement of the throttle lever when the landing surface is fully retracted and without change of the position of the landing surface on the actuation of the throttle lever.

According to the invention, the problem in question is solved by coupling the throttle lever for the engine of the aircraft with the operating lever for the auxiliary control surface, i. e., for example, a landing flap, by gearing by which on moving the throttle lever into the full throttle position the auxiliary control surface set by the second lever in the landing position is moved into its most favourable take-off position, and which moreover in the fully retracted position of the auxiliary control surface permits movement of the first lever through its complete range of movement without influencing the second lever.

Fig. 1 is a schematic view in which the levers and intermediate members essential for the control of the device are shown in different operating positions.

Fig. 2 is a detailed view in reduced size of the landing flap with the control rod attached thereto, the landing flap being shown in extended position in dotted lines.

The throttle lever 1 for the engine of the aircraft is journalled on a shaft 2 which is carried by a bearing bracket 3 secured to one longeron of the tubular aircraft fuselage 4.

5, 5' indicate a double-armed second lever which is operable normally to control the landing flap or surface (not shown), and is provided with the usual handle. The lever 5, 5' is mounted to rock on a pivot 6' which also is carried by the fuselage 4. To the arm 5' is connected a rod 6 which is coupled in suitable manner with the landing flap 20, shown in Fig. 2. For transmitting the movements of the rod 6 to the landing flap there may be employed any suitable known relay mechanism, e. g., mechanism operated mechanically, hydraulically, pneumatically or electrically.

Connected at 7 to the arm 5 of the double-armed lever is a rod comprising two adjustably-connected parts 8 and 10. In the embodiment shown the adjustable connection consists of a turn-buckle 9.

The part 10 is formed with an elongated slot 11 entered by a pin 12 carried by an intermediate lever 13 pivoted at 14 on a bearing bracket 15 attached to the fuselage 4.

The lever 13 and the throttle lever 1 are interconnected by a rod 16 which engages the lever 1 at 17 and the lever 13 at 18. At the point of connection of the rod 16 with the lever 13, say in the middle of the lever 13, there is connected a further rod 19, which, through the medium of suitable transmission members (not shown), is connected to the throttle valve of the carburetter of the aircraft engine. The operation of the improved control device is as follows:

Let us assume that the aircraft is just about to land. The levers 1, 5 and 13 are then in the positions shown in full lines in the drawing, with the engine throttled back, for example, to ⅓ throttle, and the landing flap coupled with the rod 6 is fully extended or turned into the air stream as indicated in dotted lines in Fig. 2.

If now, for example, before landing, there occurs something unexpected which renders landing impossible or imprudent, the pilot opens the throttle fully by moving the lever 1 from the position I into the position II. This movement of the lever 1 is transmitted through the rod 16 to the lever 13 which thus moves into the position indicated by II", and by the lever 13 through the rod 8 to the lever 5, 5', which latter is rocked into the intermediate position II'. The arm 5' in this movement moves the rod 6 whereby the landing flap is retracted only to the extent corresponding with the new setting of the lever 5, 5'.

The intermediate position II' of the lever 5, 5' and thus the extent to which the landing flap is retracted are adjustable by adjustment of the effective length of the rod comprising the parts 8 and 10. It is thus possible to obtain the most favourable taking off position of the landing flap corresponding to the maximum climbing ability of the aircraft.

After the aircraft has again attained a safe altitude, the pilot moves the lever 5, 5' from the position II' into the position III', and the landing flap is then fully retracted.

The length of the slot 11 provided in the part 10 is so dimensioned that the throttle lever 1, and thus also the lever 13, can now be moved from the full throttle position II or II', to the zero position III or III", without displacement of the lever 5, 5' from the setting III'. The pilot may thus move the throttle lever 1, while the landing flap is fully retracted, into any desired position without influencing the landing flap.

When the landing flap is fully extended, i. e., in the position I' of the lever 5, 5', the lever 1 can be moved from its zero position indicated in dotted lines at III, to the position indicated at I, the lever 13 passing from the position III" into the position I", without displacement of the lever 5, 5'. The aircraft can thus land with the landing flap fully extended and with the engine throttled to about ⅓ or less. The use of the arrangement is not only of advantage in restarting the flight without landing, but also in normal take off of the aircraft. The pilot in taking off need no longer pay attention as hitherto to the exact adjustment of the landing flap. He extends the landing flap fully before taking off and taxies in this condition to the starting point. As soon as he gives the engine full throttle for taking off, he simultaneously and automatically brings the landing flap as above explained into the optimum taking off position.

The invention is not limited to the embodiment described. Thus, for example, the lever 13 and the rod 16 may be omitted, and the rod 8 may connect directly the levers 1 and 5, 5'.

We claim:

1. In an engine driven aircraft having a movable control surface as an aid in landing, and a throttle lever; a double armed lever, a rod connected to one arm of said double armed lever and leading to said landing control surface to actuate the same, means operatively connecting said levers, said means comprising a rod connected at one end to the other arm of said double armed lever, and a lost motion mechanism connected to said rod, whereby movement of the throttle lever when accelerating after an attempted landing and when accelerating to take off results in retracting said control surface while normal movement of the throttle lever when the control surface is fully retracted is without influence on said control surface.

2. A control means for engine driven aircraft having a movable control surface as an aid in landing, comprising, a throttled lever, a double armed lever, a rod connected to one arm of said double armed lever and leading to said landing control surface to actuate the same, an intermediate pivoted arm, a rod connecting said intermediate arm to said throttle lever to be actuated thereby, and a rod leading from said intermediate arm to the throttle valve, means operatively connecting said double armed lever and said intermediate arm, said means comprising a rod connected to the other arm of said double armed lever, and a lost motion mechanism disposed in said connection.

3. A control means for engine driven aircraft having a movable control surface as an aid in landing, comprising, a throttle lever, a double armed lever, a rod connected to one arm of said double armed lever and leading to said landing control surface to actuate the same, an intermediate pivoted arm, a rod connecting said intermediate arm to said throttle lever to be actuated thereby, and a rod leading from said intermediate arm to the throttle valve, means operatively connecting said double armed lever and said intermediate arm, said means comprising a rod connected to the other arm of said double armed lever, and a lost motion mechanism disposed in said connection, said lost motion mechanism comprising an elongated member connected to said last named rod and having an elongated closed slot therein, and a pin projecting from said intermediate arm slidably engaged in said slot.

4. A control means for engine driven aircraft having a movable control surface as an aid in landing, comprising, a throttle lever, a double armed lever, a rod connected to one arm of said double armed lever and leading to said landing control surface to actuate the same, an intermediate pivoted arm, a rod connecting said intermediate arm to said throttle lever to be actuated thereby, and a rod leading from said intermediate arm to the throttle valve, means operatively connecting said double armed lever and said intermediate arm, said means comprising a rod connected to the other arm of said double armed lever, and a lost motion mechanism disposed in said connection, said lost motion mechanism comprising an elongated member connected to said last named rod and having an elongated closed slot therein, and a pin projecting from said intermediate arm slidably engaged in said slot, said elongated member being joined to said last named rod by a turnbuckle type connection.

5. A control means for engine driven aircraft having a movable control surface as an aid in landing, comprising, a throttle lever, a double armed lever, a rod connected to one arm of said double armed lever and leading to said landing control surface to actuate the same, an intermediate pivoted arm, a rod connecting said intermediate arm to said throttle lever to be actuated thereby, and a rod leading from said intermediate arm to the throttle valve, means operatively connecting said double armed lever and said intermediate arm, said means comprising a rod connected to the other arm of said double armed lever, and a lost motion mechanism disposed in said connection, said lost motion mechanism comprising an elongated member connected to said last named rod and having an elongated closed slot therein, and a pin projecting from said intermediate arm slidably engaged in said slot, said slot being longer than the distance said pin will travel when the throttle lever and consequently the intermediate arm are moved from full to zero position, whereby after the aircraft has attained a safe altitude and the double armed lever has been actuated to retract the said landing surface fully, the throttle lever and intermediate arm may be moved from full to zero position without displacing said double armed lever.

6. In an engine powered airplane having a wing flap capable of movement to three positions, namely a fully lowered maximum drag position, a fully retracted minimum drag position, and an intermediate high lift but low drag position; a flap and engine throttle control mechanism comprising a throttle lever for controlling said engine, a lever for adjusting said flap, an engaging device connected to and movable by said throttle lever, and means connected to said flap adjusting lever and lying in the path of movement of said engaging device, whereby when the flaps are adjusted to the fully lowered maximum drag position, movement of said throttle lever to the full power position will simultaneously operate said flap control lever to move said flaps to the intermediate high lift but low drag position, whereas when said flap lever is adjusted to move said flaps to the fully retracted minimum drag position, the said throttle lever may be operated throughout its full range of positions without effecting any change in the setting of said flap control lever.

7. In an airplane, an engine throttle control means and a control member operably connected to said throttle control means and movable by the pilot toward increasingly greater throttle open positions, a second control member, a wing lift characteristic changing means operably connected to said second control member, and adapted to be adjusted in response to pilot manipulation of said second control member, and means responsive to actuation of said wing lift characteristic changing means from relatively low drag condition to a relatively high drag condition to positively actuate said engine throttle control member and means from a throttle open condition toward throttle closed condition, the parts comprising said means responsive to actuation of said wing lift characteristic changing means, when said wing lift characteristic changing means is in relatively low drag condition, being disposed clear of the path of movement of said throttle control means throughout their entire range.

JOSEF BLASS.
WILHELM LANGGUTH.